A. PASS.
BIRD SCARING DEVICE.
APPLICATION FILED MAY 27, 1912.

1,066,045.

Patented July 1, 1913.

Witnesses:

Inventor
Arthur Pass
by
his Attorney

UNITED STATES PATENT OFFICE.

ARTHUR PASS, OF LETCHWORTH, ENGLAND.

BIRD-SCARING DEVICE.

1,066,045.  Specification of Letters Patent.  Patented July 1, 1913.

Application filed May 27, 1912. Serial No. 700,137.

*To all whom it may concern:*

Be it known that I, ARTHUR PASS, a subject of His Majesty the King of Great Britain, residing at Leys avenue, Letchworth, in the county of Hertford, England, picture-framer, have invented a certain new and useful Bird-Scaring Device; and I do hereby declare the following to be a full, clear, and exact description of the invention, such as will enable others skilled in the art to which it appertains to make and use the same.

This invention relates to a cheap, simple and effective device for scaring birds from strawberry and seed beds and the like.

According to my invention, the device consists of a light wire rod adapted to be vertically supported, as by inserting its lower end into a peg which may be thrust into the ground, while its upper end has secured to it a strip or strips of calico, paper or the like. The lower portion of this rod is twisted into helical or spiral form and a spring rod or standard of great flexibility is thus provided which will be kept in a state of constant vibration by the lightest draft of air.

Figure 1:
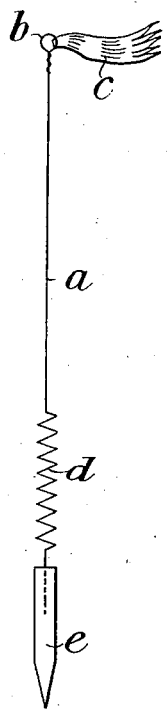
Figure 2:
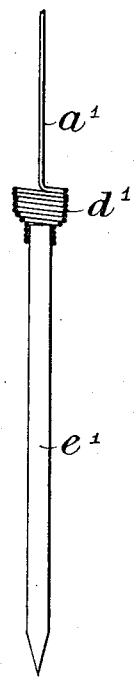

In the annexed drawings Figure 1 illustrates a bird scaring device according to my invention, and Fig. 2 shows a slightly modified form.

$a$ is the straight portion of the light wire rod having at its upper end a loop $b$ to which a strip or strips $c$ of calico, paper or the like is secured.

$d$ is the helical or spiral portion of the rod whose lower end is (in Fig. 1) inserted in the wooden peg $e$ adapted to be thrust into the ground. Or this peg might be dispensed with and the lower straight end of the rod extended and thrust directly into the ground or elsewhere. The straight portion $a$ of the rod may be of any convenient length, say 30 inches or so. In Fig. 2 the lower portion of the rod $a^1$ is formed into a close helix or spiral $d^1$ secured to the peg $e^1$ by winding a portion of it around the end of said peg.

What I claim and desire to secure by Letters Patent of the United States is:—

A bird scaring device embodying therein a single strand of wire formed into a loop at one end to receive a strip of cloth, paper or the like, a helix or spiral formed near the opposite end of said wire, and a peg attached to the end of the wire nearest the helix or spiral.

In testimony whereof I have hereunto set my hand in the presence of two witnesses.

ARTHUR PASS.

Witnesses:
 EDITH MAY TURNER,
 ERNEST CHARLES POPE.